Aug. 18, 1964 R. D. ALLEMAN 3,144,726

ANIMATION DEVICE

Filed Feb. 5, 1962

INVENTOR.
RONALD D. ALLEMAN
BY George F. Westerman
ATTORNEY

United States Patent Office 3,144,726

Patented Aug. 18, 1964

3,144,726

ANIMATION DEVICE

Ronald D. Alleman, Fort Baker, Calif. (2nd Army, 497th Eng. Co., Port Const., Fort Belvoir, Va.)

Filed Feb. 5, 1962, Ser. No. 171,321
1 Claim. (Cl. 40—81)
(Granted under Title 35, U.S. Code (1952), sec. 266)

The invention described herein may be manufactured and used by or for the Government for governmental purposes without the payment of any royalty thereon.

The present invention relates to a mechanism for producing an illusion of motion from a succession or series of picture-bearing cards, film or the like, by manipulation thereof in such a manner that successive cards or film of a series thereof may be removed from one portion of a stack or supply thereof and deposited at another position within such stack or supply in a manner so that, after viewing, each card will come to assume its original serial position as the stack or supply thereof becomes exhausted by such manipulative operations. These operations can be carried out at such speed that there appears to the eye of a viewer an illusion of continuous or uninterrupted motion between the pictures or images on successive cards or at a slower speed enabling reading or close viewing of individual cards. Viewing of the individual cards successively is accomplished as each is held stationary momentarily at one point in the above cycle.

Accordingly, an object of the present invention is to provide a mechanism of the above-indicated character which is useful as a training aid in connection with military training, but which is also adaptable to a wide diversity of applications.

A second object of this invention is to provide for an inexpensive viewer of opaque film frames, which is manually operated, and compact and simple in construction and operation, which is readily adapted to motor driven operation and a multitude of uses involving the manipulation of various types of intelligence bearing or intelligence receptive sheets.

The structural features of an embodiment of the invention are illustrated in the accompanying drawings, in which.

It will be understood that the term "cards" as used throughout the present description is intended to include in addition to flexible opaque image bearing cards, transparent and translucent image bearing photographic film which is to be manipulated in like manner to opaque cards in the construction illustrated in the accompanying drawings.

Figure 1:
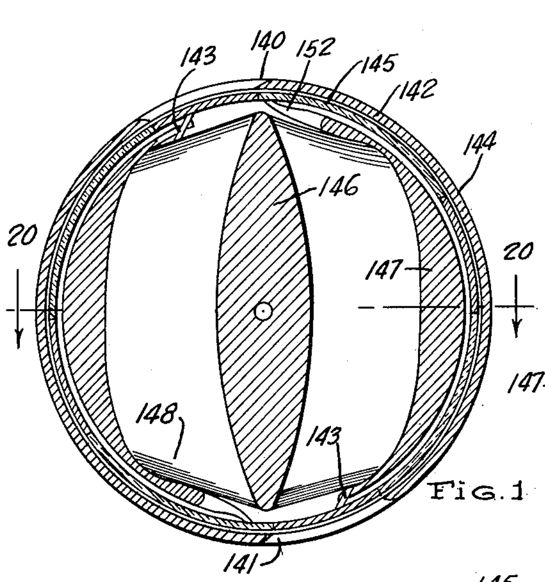
FIG. 1 is a transverse sectional view of an embodiment of an animation device constructed in accordance with this invention.
Figure 2:
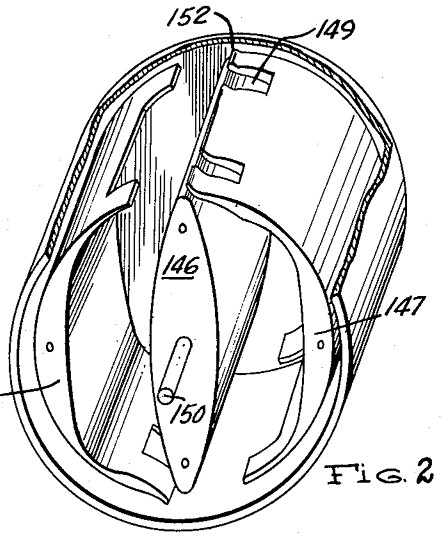
FIG. 2 is a perspective view of the card-holding magazine of FIG. 1.
Figure 3:
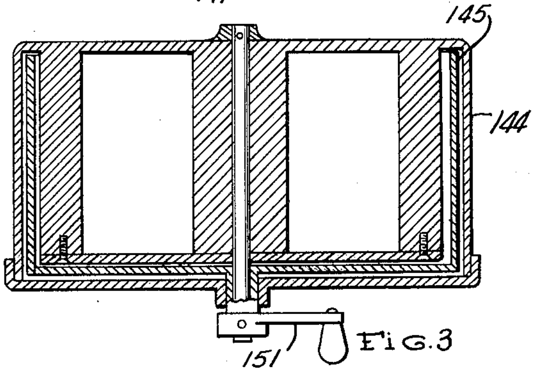
FIG. 3 is a horizontal section taken on the line 20—20 of FIG. 1.
Figure 4:
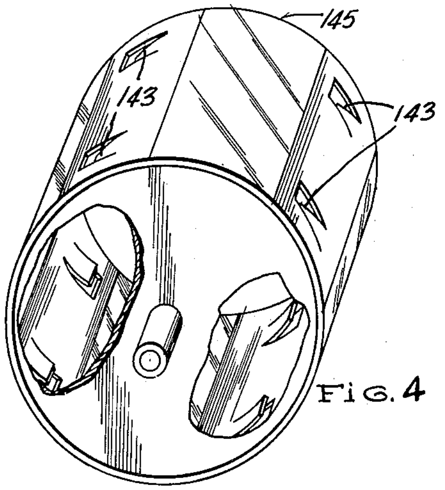
FIG. 4 is a perspective view of a cylindrical card pickup and transfer element employed in the embodiment of FIG. 1.
Figure 5:
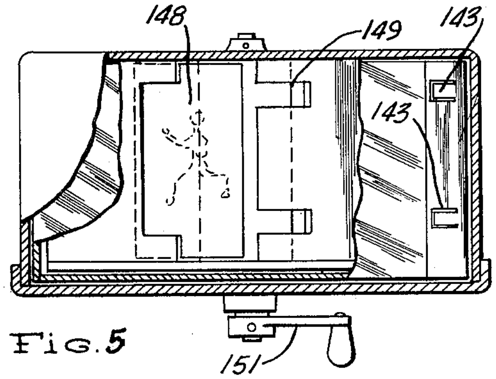
FIG. 5 is a detail horizontal section of the embodiment of FIG. 1, with the card-holding magazine, being shown complete and the outer case and transfer element cut away.
Figure 6:
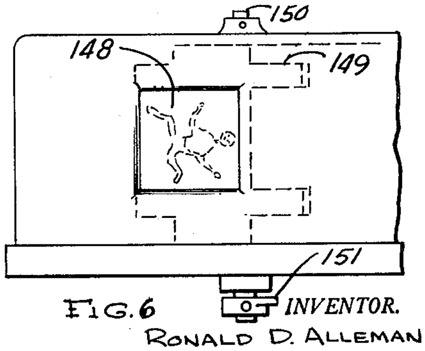
FIG. 6 is a top plan view of the embodiment of FIG. 1, showing the viewing opening.

FIGS. 1–6 depict, an embodiment of this invention wherein a card rotating cylinder 145 (FIG. 4) on axle 150 and turned by crank 151, consisting of alternating transparent and shuttered areas rotates within outer case 144 having viewing apertures 140 and 141. Held stationary within rotating cylinder 145 is the card magazine having inner ellipsoid member 146 and outer portions 147. Cards 148 are loaded in the magazine on both sides of center ellipsoid member 146. When the magazine is loaded and rotating cylinder 145 is turned, pickup tabs 143 contact the outermost card on each end of the magazine as they protrude into the magazine through slots 149 of the magazine. The card is withdrawn and passes under the viewing aperture 140, or 141 as the case may be, in the direction of rotation of the cylinder until it contacts flanges 152 of the magazine which direct the card into the opposite chamber of the magazine. As can be seen from FIG. 1, with the rotating cylinder turning clockwise, a card is withdrawn from the left chamber of the magazine and is thereafter inserted into the right chamber, while simultaneously the bottom card in the right chamber is withdrawn therefrom and inserted into the left chamber. As the rotating cylinder is turned rapidly, the quick shuffling of cards from one chamber of the magazine to the other as seen through the viewing apertures and the transparent areas of the cylinder, creates the illusion of movement.

I claim:

A device for viewing in succession a series of indicia-bearing cards, said device comprising:

(*a*) a stationary dual channel card-holding magazine for two stacks of indicia-bearing cards, each of said channels being open at each end and having card exit portals and card entry portals, the entry portals of one chamber being adjacent to the exit portals of the other chamber;

(*b*) an ellipsoid member separating the two channels of said card-holding magazine and causing the stacks of cards to be flared for easy pick-up of successive cards;

(*c*) a cylinder surrounding said stationary magazine and rotatable thereabout, said cylinder having alternately transparent and shuttered sectional areas;

(*d*) card withdrawal and conveyor means including a plurality of internally projecting card contact tabs which contact the cards only at the exit and entry portals, said tabs being so disposed as to turn about the card magazine with the rotating cylinder and to transfer cards from the exit portals of one chamber of the magazine to the entry portals of the other chamber, such transfer taking place while the shuttered portion of the rotatable cylinder covers the transfer from the viewers sight;

(*e*) card deposite means including card guides positioned on the magazine over the entry portals so as to force the cards into the chamber;

(*f*) turning means for said rotatable cylinder;

(*g*) a case enclosing said magazine and rotatable cylinder and mounting said rotatable cylinder; and (*h*) a viewing aperture in said case so disposed as to allow a view of successive cards.

References Cited in the file of this patent

UNITED STATES PATENTS

| | | |
|---|---|---|
| 120,309 | Miller | Oct. 24, 1871 |
| 309,880 | Rosenstock | Dec. 30, 1884 |
| 519,483 | Smith | May 8, 1894 |
| 519,484 | Smith | May 8, 1894 |
| 594,506 | Wheeler | Nov. 30, 1897 |
| 872,455 | Roesler | Dec. 3, 1907 |
| 981,167 | Chick | Jan. 10, 1911 |
| 986,965 | Crogan | Mar. 14, 1911 |
| 2,516,793 | Mueller | July 25, 1950 |